(12) United States Patent
Morgan et al.

(10) Patent No.: US 12,479,531 B2
(45) Date of Patent: Nov. 25, 2025

(54) WHEELED VEHICLE WITH TILT CONTROL

(71) Applicant: SUPERSMITH LIMITED, Godalming (GB)

(72) Inventors: Tom Morgan, Godalming (GB); Frederick Russell-Pavier, Bristol (GB)

(73) Assignee: SUPERSMITH LIMITED, Godalming (GB)

( * ) Notice: Subject to any disclaimer, the term of this patent is extended or adjusted under 35 U.S.C. 154(b) by 273 days.

(21) Appl. No.: 18/248,185

(22) PCT Filed: Oct. 1, 2021

(86) PCT No.: PCT/GB2021/052540
§ 371 (c)(1),
(2) Date: Apr. 6, 2023

(87) PCT Pub. No.: WO2022/074362
PCT Pub. Date: Apr. 14, 2022

(65) Prior Publication Data
US 2023/0373587 A1    Nov. 23, 2023

(30) Foreign Application Priority Data

Oct. 8, 2020 (GB) ...................................... 2015964

(51) Int. Cl.
*B62K 5/10* (2013.01)
*A61G 5/04* (2013.01)
*B62K 5/025* (2013.01)

(52) U.S. Cl.
CPC ................ *B62K 5/10* (2013.01); *B62K 5/025* (2013.01); *A61G 5/04* (2013.01)

(58) Field of Classification Search
CPC .......... B62K 5/10; B62K 5/025; B62K 5/023; A61G 5/04
See application file for complete search history.

(56) References Cited

U.S. PATENT DOCUMENTS

| | | | |
|---|---|---|---|
| 4,887,829 A | 12/1989 | Prince | |
| 4,921,263 A * | 5/1990 | Patin ...................... | B62D 37/04 280/6.154 |

(Continued)

FOREIGN PATENT DOCUMENTS

| | | |
|---|---|---|
| DE | 44 23 859 A1 | 8/1995 |
| DE | 10 2006 052 041 A1 | 5/2008 |

(Continued)

OTHER PUBLICATIONS

European Patent Office, International Search Report in PCT App. No. PCT/GB2021/052540, Mar. 1, 2022, pp. 1-5.

(Continued)

*Primary Examiner* — Kurt Philip Liethen
(74) *Attorney, Agent, or Firm* — CAHN & SAMUELS, LLP

(57) ABSTRACT

The invention concerns a wheeled vehicle (10) which is able to regulate its lateral tilt. In a preferred aspect the vehicle (10) comprises a seat (28) for supporting a rider, and a chassis (18) which carries the seat. A steerable wheel (12) is carried by the chassis and is operably coupled to a steering arrangement (30, 34) for turning the steerable wheel (12) to effect steering of the vehicle (10). A left wheel-bearing arm (66) carries a left wheel (14) and is pivotally coupled to the chassis (18), so that pivotal movement of the left wheel-bearing arm (66) provides up and down movement of the left wheel (12) relative to the chassis (18). A right wheel-bearing arm (68) carries a right wheel (16) and is pivotally coupled to the chassis (18) to be movable independently of the left wheel-bearing arm (66), so that pivotal movement of the right wheel-bearing arm (68) provides up and down movement of the right wheel (16) relative to the chassis (18). A left control line (76) is led from a left tether (79) on the left wheel-bearing arm (66) to an actuator (84) carried by the chassis (18), so that upward movement of the left wheel (14)

(Continued)

relative to the chassis is restrained by the control line (18). A right control line (82) is led from a right tether (78) on the right wheel-bearing arm (68) to the actuator (84), so that upward movement of the right wheel (16) relative to the chassis (18) is restrained by the right control line (82). The actuator (84) is operable in a first direction to pay out the left control line (76) whilst drawing in the right control line (82), permitting the left wheel (14) to move up relative to the chassis (18) and causing the right wheel (16) to move down relative to the chassis (18), thereby causing the vehicle (10) to tilt toward the left. The actuator (84) is operable in a second direction to pay out the right control line (82) whilst drawing in the left control line (76), permitting the right wheel (16) to move up relative to the chassis (18) and causing the left wheel (14) to move down relative to the chassis (18), thereby causing the vehicle (10) to tilt toward the right.

20 Claims, 9 Drawing Sheets

(56) References Cited

U.S. PATENT DOCUMENTS

| | | | | |
|---|---|---|---|---|
| 5,028,064 | A * | 7/1991 | Johnson | A61G 5/1081 |
| | | | | 280/266 |
| 5,116,069 | A | 5/1992 | Miller | |
| 5,762,350 | A * | 6/1998 | Jolly | B62K 5/023 |
| | | | | 280/252 |
| 6,902,177 | B2 * | 6/2005 | Lindsay | A61G 5/023 |
| | | | | 280/282 |
| 7,343,997 | B1 | 3/2008 | Mathies | |
| 9,487,234 | B1 | 11/2016 | Mathies et al. | |
| 9,616,922 | B2 * | 4/2017 | Suzuki | B60L 15/2036 |
| 10,501,119 | B2 | 12/2019 | Doerksen et al. | |
| 11,052,942 | B2 * | 7/2021 | Doerksen | B62K 5/05 |
| 2008/0238005 | A1 * | 10/2008 | James | B62D 9/02 |
| | | | | 280/5.509 |
| 2008/0290618 | A1 | 11/2008 | Yanaka et al. | |
| 2010/0044977 | A1 * | 2/2010 | Hughes | B62K 5/10 |
| | | | | 280/5.509 |
| 2014/0049012 | A1 * | 2/2014 | Ono | B60G 17/01908 |
| | | | | 280/5.514 |
| 2015/0274160 | A1 * | 10/2015 | Lee | B62B 6/002 |
| | | | | 180/215 |
| 2018/0170474 | A1 * | 6/2018 | Ohno | B62K 5/08 |

FOREIGN PATENT DOCUMENTS

| | | |
|---|---|---|
| DE | 10 2009 042 662 A1 | 3/2011 |
| EP | 0 606 191 A1 | 7/1994 |
| EP | 1 346 907 A2 | 9/2003 |
| FR | 2 348 844 A1 | 11/1977 |
| FR | 2 995 869 A1 | 3/2014 |
| WO | 2008/052539 A1 | 3/2008 |
| WO | 2013/005007 A1 | 1/2013 |
| WO | 2017/099576 A1 | 6/2017 |
| WO | 2020/117044 A1 | 6/2020 |

OTHER PUBLICATIONS

European Patent Office, Written Opinion in PCT App. No. PCT/GB2021/052540, Mar. 1, 2022, pp. 1-10.
European Patent Office, English Abstract for DE4423859A1, printed on Mar. 30, 2023.
European Patent Office, English Abstract for DE102006052041A1, printed on Mar. 30, 2023.
European Patent Office, English Abstract for DE102009042662A1, printed on Mar. 30, 2023.
European Patent Office, English Abstract for FR2348844A1, printed on Mar. 30, 2023.
European Patent Office, English Abstract for FR2995869A1, printed on Mar. 30, 2023.

* cited by examiner

WHEELED VEHICLE WITH TILT CONTROL

The present invention is concerned with a motorised, wheeled vehicle having active tilt control.

One application of the present invention is in relation to mobility scooters, such as those used by persons who, perhaps for reasons related to age or infirmity, have difficulties in walking. Mobility scooters are known in a range of forms. They are often electric-powered, four-wheeled vehicles of modest length and width, being thus well suited to use on pavements and other paths alongside pedestrians. Mobility scooters often lack an enclosed cabin, having a low-built chassis housing batteries and electrics, and an upstanding stem to support a seat for the user. Steering may be provided through a simple handlebar arrangement controlling a steered pair of front wheels. Some existing mobility scooters have a tricycle layout.

Traversing ground that is uneven or inclined can be problematic for mobility scooters and their riders. Due to their modest width, mobility scooters may be somewhat unstable when required to traverse steeply inclined ground, and even if a scooter is able to remain upright on such ground, the inclination of the scooter that it creates may be disquieting for the user. Even an urban environment provides challenges in this respect. Consider for example the case where one side wheel moves from pavement to road, descending the kerb in the process. This may cause a conventional vehicle to lurch to one side and then to remain inclined, which may cause the user concern or conceivably even physical harm.

So, it is desirable to make possible provision of a low-speed vehicle, which may be a mobility scooter, which is able to control its own angle of tilt when traversing uneven ground. Such a vehicle is intended to keep its chassis and its rider essentially upright (at least laterally—i.e. not greatly inclined to left or right) despite inclination or unevenness of the ground beneath.

Vehicles that have three (or in some cases four) ground wheels, and that nonetheless provide in some way for a chassis to tilt relative to the ground beneath, are known in a variety of forms. A number of documents in this broad general category will be discussed below. Some are akin to a bicycle or motorcycle, in that they allow the vehicle to tilt as determined by the dynamic conditions, without any powered mechanism to directly regulate vehicle tilt. Predominantly, tilting mechanisms, whether passive or active, are presented as a way to improve dynamics of the vehicle when cornering, by enabling or actively causing the vehicle to lean into a turn, assisting its dynamic stability and its road holding at speed.

In both respects, the problems presented by the case of a low speed vehicle intended e.g. predominantly for pavement use, rather than faster use on roads, are somewhat different. Weight is an important factor in this context, and the relatively complex mechanics used in many of the prior art vehicles would be problematic in this respect. Provision for example of hydraulics, in the context of a relatively simple electrically propelled vehicle, would be complex and expensive. What is needed is a mechanism capable of actively regulating vehicle tilt which is simple in construction, can be constructed in a manner that does not contribute excessively to a vehicle's overall mass, and is preferably simple to service and maintain.

Although not all embodiments of the present invention need be capable of folding or otherwise collapsing to a compact configuration, this is a desirable feature in some examples, where the ability to place a scooter in for example the boot of a motor car may be highly advantageous.

Another challenge in relation to tilting wheeled vehicles, not one that is limited to mobility scooters as such, is that a mode of control that is appropriate to low speeds is not necessarily appropriate at higher speeds. At low speeds, maintenance of balance and stability is desirable and can be challenging. At higher speeds, balance may be less problematic, especially if the rider is able to balance the vehicle dynamically, and a more active and/or dynamic mode of operation may be desirable. Some of the vehicles belonging to the prior art and discussed below are able to lock their wheels in an "upright" configuration when the vehicle is static, and to release them—to allow the vehicle to tilt freely—once underway. But this is only a partial solution to the aforementioned problem.

Some examples of tilting vehicles belonging to the prior art are given in the following documents.

U.S. Pat. No. 4,887,829A, Prince, is concerned especially with "off road riding", and addresses problems relating to the dynamic balancing of three-wheeled vehicles when off road. The document discloses a three-wheeled vehicle whose rear wheels are each carried on a respective swing arm. Each swing arm is connected through a respective shock absorber to a respective end of a rocking arm, which is itself pivotally connected to the vehicle's frame. The arrangement appears to be intended to enable the rider to lean in to a curve, as would a rider on a two-wheeled vehicle such as a motorbike. It does not suggest that the arrangement of swing arms should be in any way automatically actuated.

U.S. Pat. No. 5,116,069A, Miller, discloses a three-wheeled vehicle which is presented as an improvement upon conventional four-wheeled motor vehicles, and which uses a somewhat complex hydraulic system to cause the vehicle to lean into a turn in order to maintain loading of the inner wheel and so avoid a tendency for such a vehicle to sideslip due to overloading of the wheel on the outside of the turn. The two rear wheels of the vehicle are each provided with a respective hydraulic actuator to raise and lower them, and there is a mechanical control arrangement for the hydraulics making use of a pair of heavy pendulums acting on valves of the hydraulics. Whether or not this would have been a practical way to control leaning of a road-going motor vehicle, it is a mechanically complex arrangement.

EP0606191A1, Calleja Vidal, concerns a three-wheeled vehicle whose rear wheels are carried on respective swinging forks, to enable them to rise and fall, and are coupled through an arrangement comprising a lever coupled at each of its ends to a respective swinging fork through a respective connecting rod. The "balancer" arrangement can be locked through a form of mechanical brake, as for example when the vehicle is static, but It is not suggested in the document that it will be actively driven, in order to control it automatically.

DE4423859A1, Ernst, describes a vehicle having a balancing mechanism using a respective hydraulic actuator for each of a pair of wheels, the actuators having pressure chambers which are directly connected through a pipe so that one moves oppositely to the other. Another embodiment uses a chain led around four wheels. In either case it seems clear that leaning of the vehicle is caused by a shift of weight of the driver.

EP1346907A, Benelli S.p.A., describes a suspension arrangement for twinned swing-axle wheels of a tilting vehicle. The suspension has a somewhat complex lever arrangement to coordinate movement of the twinned wheels, which makes possible "the riding style typically used for motorcycles". The tilting action of the suspension can be locked, especially to maintain the vehicle in a stable condition when it is stationary, but dynamic control of the tilting mechanism is not taught by this document.

U.S. Pat. No. 7,343,997B, Matthies, shows in its drawings a form of three-wheeled motorcycle having what is in essence a double-wishbone type rear suspension having coilover-type shock absorbing units. The upper ends of these units are coupled to a lever arrangement comprising a connecting rod coupled to an actuator. The arrangement enables tilting of the vehicle by virtue of upward/downward movement of the shock absorbing units and of the wheels to which they are coupled, and the actuator can be controlled to tilt the bike in the direction of a turn. The same mechanical arrangement is disclosed in U.S. Pat. No. 9,487,234, Matthies.

WO2008/052539A1, Steinhilber, discloses a three-wheeled vehicle with a form of tilting mechanism using a pair of pivotally mounted trailing arms to carry the respective rear wheels. In some embodiments these trailing arms are extended forwardly so that they can be actuated by the rider's feet, giving the rider control over the vehicle's banking in that way. There is a brief suggestion that this pedal mechanism might be assisted electrically or hydraulically.

DE102006052041A, Steinhilber, discloses a tilting three-wheeled vehicle in which a tilting mechanism associated with the rear wheels is combined with a steering mechanism acting on the front wheel. In order to enable increasing bank at higher speeds, a separate hydraulic unit is provided to provide speed-dependent adjustment of the vehicle's inclination.

US20080290618A, Toyota Jidosha Kabushiki Kaisha, describes in detail a three-wheeled vehicle with a complex suspension system in which a form of coordinated control is exercised over steering angle, the vehicle's angle of tilt to the left and right, and also the vehicle's angle of tilt fore-and-aft, but an arrangement using electrical control over both rear wheels. The control system appears to be capable of controlling the two wheels independently.

DE102009042662, Bayerische Motoren Werke Aktiengesellschaft, describes a three-wheeled vehicle in which the paired wheels are driven to propel the vehicle, and a hydraulic arrangement acts on them to actively control the vehicle's angle of tilt.

FR2995869, Pallanca et al, provides another example of a tilting vehicle in which the twinned rear wheels are coupled through a lever mechanism, the vehicle is free to tilt in the manner of a two-wheeled vehicle underway, and a locking mechanism is provided to lock the tilting arrangement selectively, e.g. when static.

WO2017099576, Koi Moto Sdn Bhd, depicts several different wheeled vehicles, some with four wheels and another taking the form of a three-wheeled child's scooter, as well as a number of mechanisms which cause the track width of a pair of wheels to be varied along with their tilt angle.

U.S. Ser. No. 10/501,119B, Doerksen, depicts and describes and vehicle using a four-bar arrangement to cause a pair of wheels to tilt along with the vehicle's central chassis. In some embodiments a geared drive arrangement controls this tilting action.

The present invention provides a vehicle in accordance with the appended independent claims.

Specific embodiments of the present invention will now be described, by way of example only, with reference to the accompanying drawings, in which.

Figure 1:
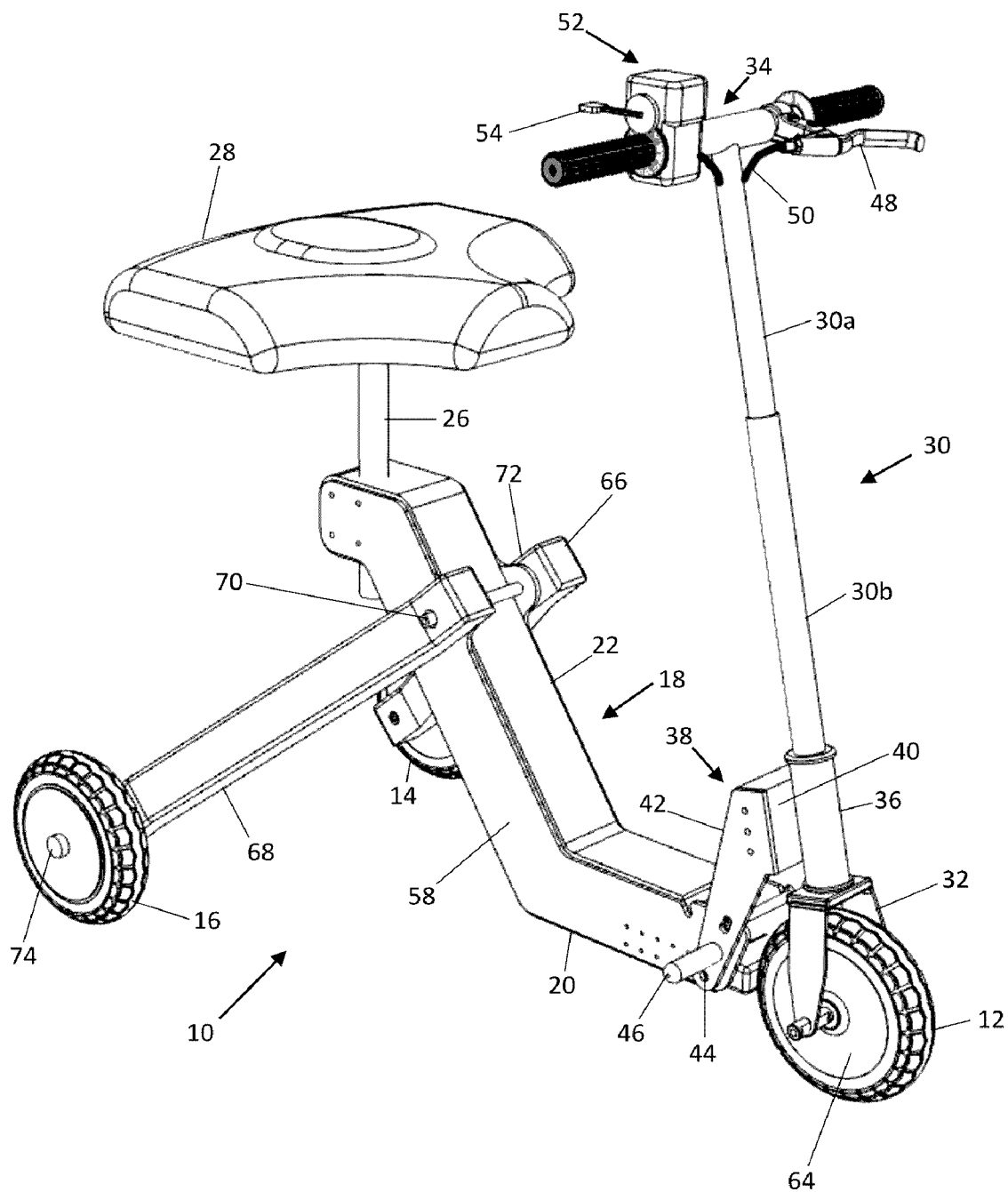
FIG. 1 is a view of a vehicle embodying the present invention from a viewpoint in front and to one side of the vehicle.
Figure 2:
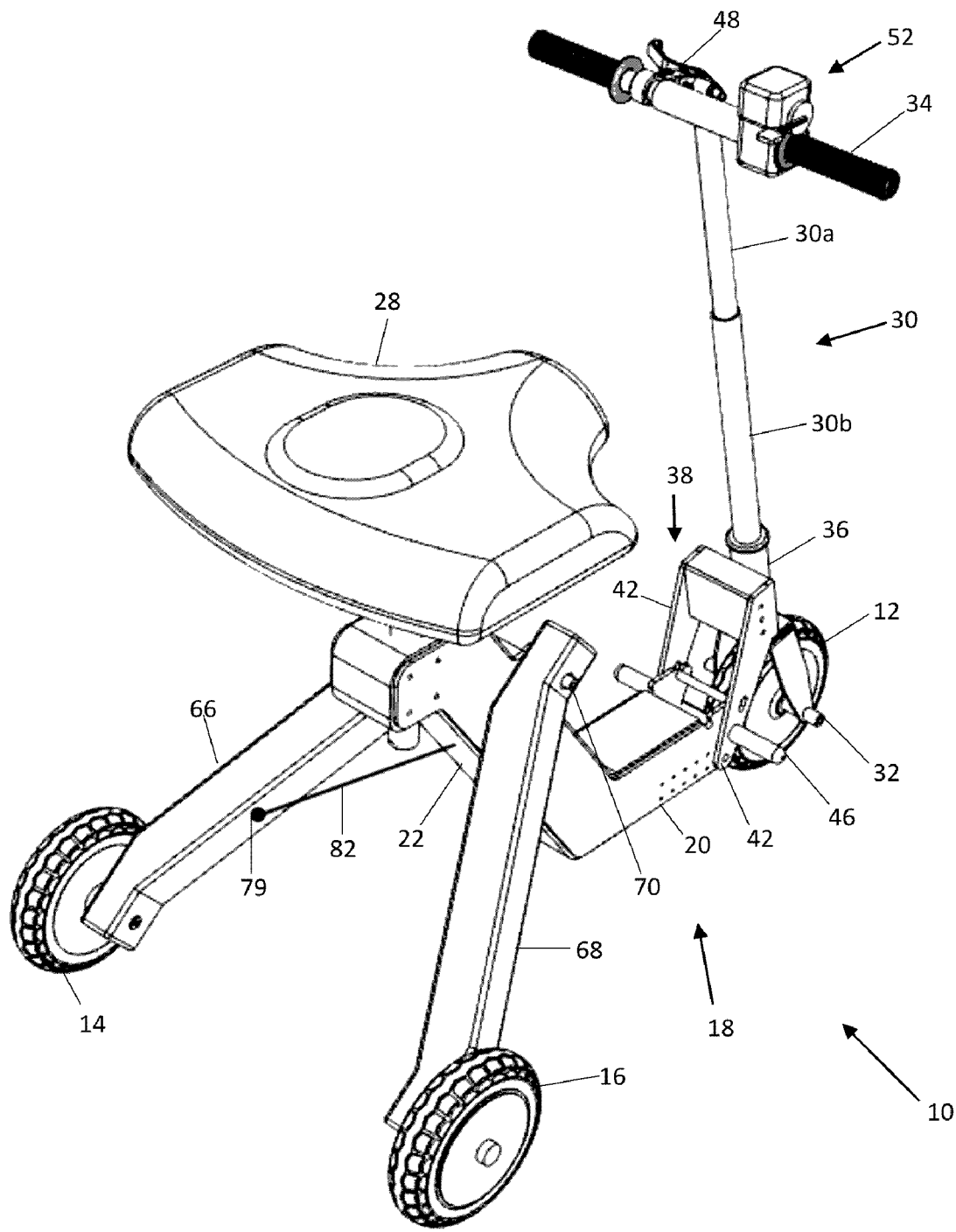
FIG. 2 is another view of the vehicle from a viewpoint above, to one side and to the rear of the vehicle.
Figure 3:
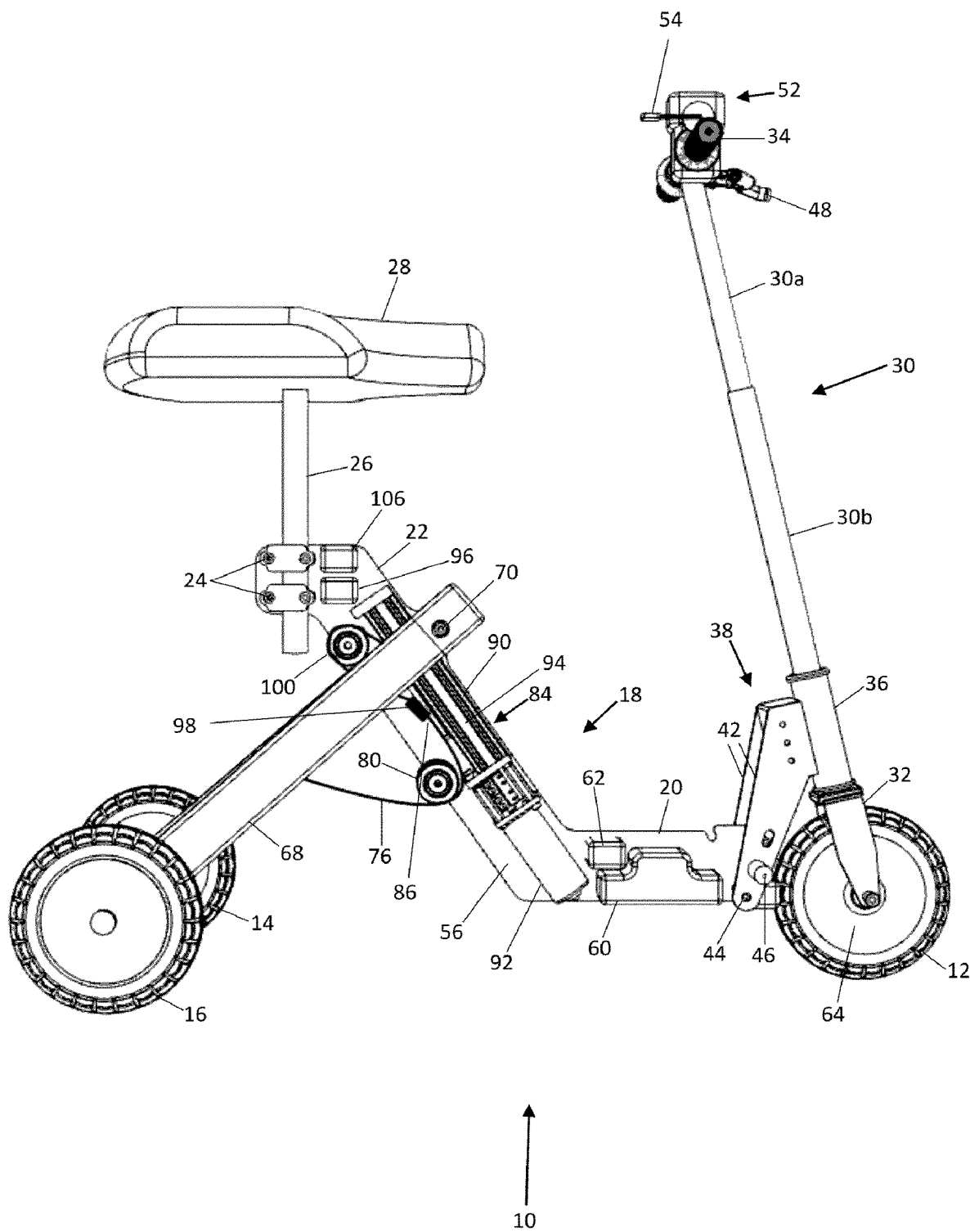
FIG. 3 is a side view of the vehicle.
Figure 4:
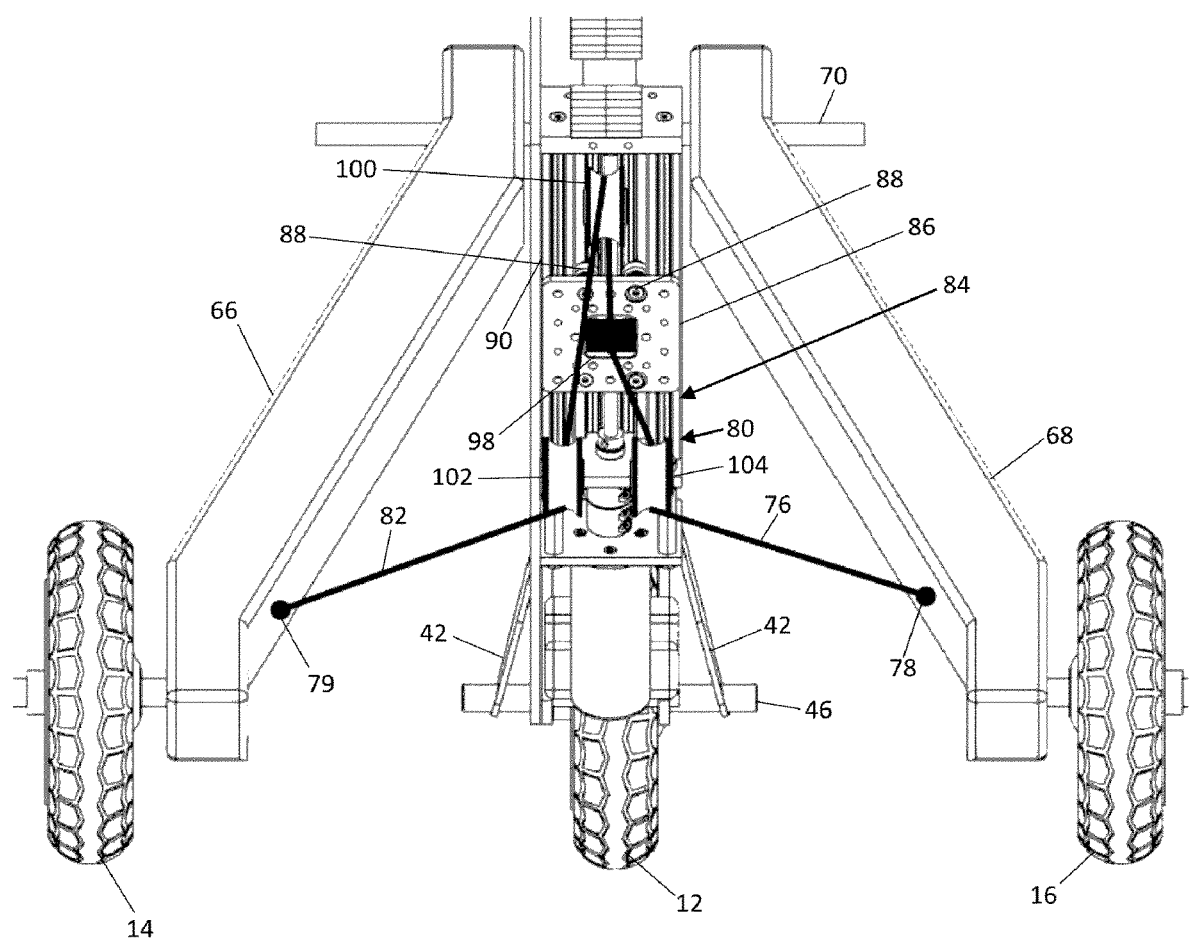
FIG. 4 is a view of the vehicle from the rear.

The present embodiment is an electrically-driven vehicle 10 having a tricycle layout, with a single front wheel 12 and left and right rear wheels 14, 16. The invention could instead be implemented in a tricycle layout having two wheels at the front and one at the rear. The wheels may be referred to as "ground wheels" as of course they run upon the ground beneath the vehicle 10.

The vehicle 10 has a simple chassis 18 comprising in this example an elbowed fore-and-aft extending structure having a roughly horizontally extending front chassis member 20 leading rearwardly to an inclined chassis member 22. Close to its upper extremity, the inclined chassis member 22 contains a fitting 24 for receiving a stem 26 of a seat 28. In the present embodiment the seat 28 is a simple saddle-type arrangement without a backrest, but it may take other forms. In particular, where the vehicle 10 is used as a mobility scooter, it may be configured to provide the user with more support e.g. through a backrest and/or armrests and/or a head support. The fitting 24 permits the seat 28 to be raised and lowered according to the requirements of the user. In the present embodiment it comprises a pair of stem-engaging brackets secured by threaded fasteners which cause the brackets to grip the stem when tight, and which release it to permit the stem to slide when loosened.

At the front of the vehicle 10 is a generally upright steering column 30 whose lower end carries the front wheel 12 though a fork 32. The length of the steering column is telescopically adjustable in order to permit adjustment of the height of a handlebar 34. For this purpose, the steering column comprises an upper column part 30*a* slidably received in a lower column part 30*b*. A releasable locking arrangement is provided to lock the two column parts 30*a*, 30*b* against relative longitudinal and rotational movement in use, but suitable arrangements are well known to the skilled mechanical engineer and will not be described herein.

The steering column 30 is coupled to the chassis 18 through a steering bearing 36 carried on a bearing bracket 38. The steering bearing 36 comprises a tubular member through which the steering column 30 passes. In the present embodiment this forms a plain bearing for the steering column 30 but in other embodiments it may, for example, contain ball or needle bearings. The bearing bracket 38 comprises in this example an upright front panel 40 carrying the steering bearing 36. On its left and right sides, the front panel 40 carries left and right wings 42 extending downwardly to lie on either side of the front chassis member 20. The wings 42 form a pivotal attachment between the front chassis member 20 and the bearing bracket 38. For this purpose, a pivot pin, whose end is seen at 44 in FIG. 1, passes through aligned bores in the wings 42 and in the front chassis member 20. In order to lock the bearing bracket 38 (and the steering column 30 carried upon it) in its upright orientation for use, left and right locking pins 46 each pass through a bore in their respective wing 42 into a respective complementary bore in the front chassis member 20. The locking pins can be withdrawn to enable pivoting of the steering bracket 38—and of the steering column 30—with respect to the chassis 18.

The handlebar 34 carries a brake control in the form of a brake lever 48 for controlling a brake arrangement acting on the wheels to brake the vehicle. A range of suitable brake arrangements is well known to the skilled mechanical engineer and details are not provided herein, except that it can be seen in the drawings that a brake cable 50 leads from the brake lever 48 into the steering column 30. The handlebar 34 also carries a user-operable speed control 52 having a lever 54 whose position represents a user speed or power requirement for input to a propulsion control system.

The front chassis member 20 and the inclined chassis member 22 each comprise a hollow tubular section (specifically, they have a square or rectangular hollow cross section) forming an internal chassis space 56 which contains working parts of the vehicle. A chassis side panel 58 is in the present embodiment removable to provide access to these working parts.

The vehicle 10 is electrically propelled by driving of the front wheel 12. Electrical propulsion is especially well suited to a vehicle of the present type, but other forms of propulsion, including any suitable form of combustion engine, could in principle be adopted in other vehicles embodying the present invention. Power, both for vehicle propulsion and for other functions to be explained below, is provided by a battery 60 and is delivered through an electronic motor driver 62 to an electric motor arrangement which is housed in hub 64 of the front wheel 12. The battery 60 and the motor driver 62 are housed in the internal chassis space 56.

It must be understood that while the details of a specific chassis construction and steering arrangement have been described herein, the invention is not in any sense limited to implementation in a vehicle having this form of chassis or of steering.

The left wheel 14 is carried on a lower extremity of a left wheel-bearing arm 66 which is pivotally coupled at its upper extremity to the chassis 18. The right wheel 16 is similarly carried on a lower extremity of a right wheel-bearing arm 68 which is pivotally coupled at its upper extremity to the chassis 18. In the present embodiment, the left and right wheel-bearing arms 66, 68 turn about a common pivot axis defined by a pivot bar 70 which extends through pivot brackets 72 carried on the inclined chassis member 22 and through respective bearings (not seen) in the left and right wheel-bearing arms 66, 68. Thus the pivot arrangements permit the left and right wheel-bearing arms 66, 68 to turn independently of one another. In operation the angular range through which the wheel-bearing arms turn is small—less than ninety degrees. It will be apparent that as either of the wheel-bearing arms 66, 68 turns, its respective wheel 14, 16 is either raised or lowered relative to the chassis 18, changing the tilt of the vehicle 10. The wheel-bearing arms 66, 68 may be referred to as trailing arms, in that they extend backwardly (and downwardly) from the pivot axis defined by the pivot bar 70.

The left and right wheels each rotate about a respective wheel axis defined by a respective axle, one of whose ends is seen at 74 in FIG. 1. In the present embodiment the wheel axes are parallel to the pivot axis of the wheel-bearing arms 66, 68, so that turning motion of the wheel-bearing arms 66, 68 does not change the orientation of the wheel axes with respect to the chassis 18. The left and right wheel-bearing arms are in use each inclined downwardly at all times, in the sense that the axis of the wheel carried on the arm is lower than the pivot axis 70 about which the arm turns.

The wheel-bearing arms 66, 68 need not necessarily pivot about the same axis. The pivot axis of one could be inclined to the pivot axis of the other, and/or their pivot axes could be offset.

A tilt control mechanism is provided which controls the angular positions of the left and right wheel-bearing arms 66, 68 (i.e. it controls their turning movement about the pivot axis defined by the pivot bar 70) and thereby controls tilt of the vehicle 10. The word "tilt" is used herein to refer to an angle formed between the chassis 18 and a vertical plane extending in the fore-and-aft direction of the vehicle. To put this another way, "tilt" is the vehicle's angle of inclination to the left or right. It will be apparent from the drawings that raising the left wheel 14 will cause the vehicle to tilt to the left. Moving the right wheel downwards will have the same effect. If one wheel is raised a certain distance while the other is lowered by the same distance then the vehicle will be caused to tilt with minimal change in its height.

In the present embodiment, the tilt control mechanism comprises a control line 76, 82. The term "control line" used herein refers to some elongate and flexible member capable of sustaining a tensile load without excessive strain, and should be understood to encompass, without limitation, wire, cord, rope and chain. In the present embodiment, the control line 76, 82 is a cord made from ultra-high molecular weight polyethylene, sold under the registered trade mark Dyneema® and selected for its high stiffness under tensile loading. Nonetheless a range of different materials could be used for the control line 76, 82.

Figure 5:
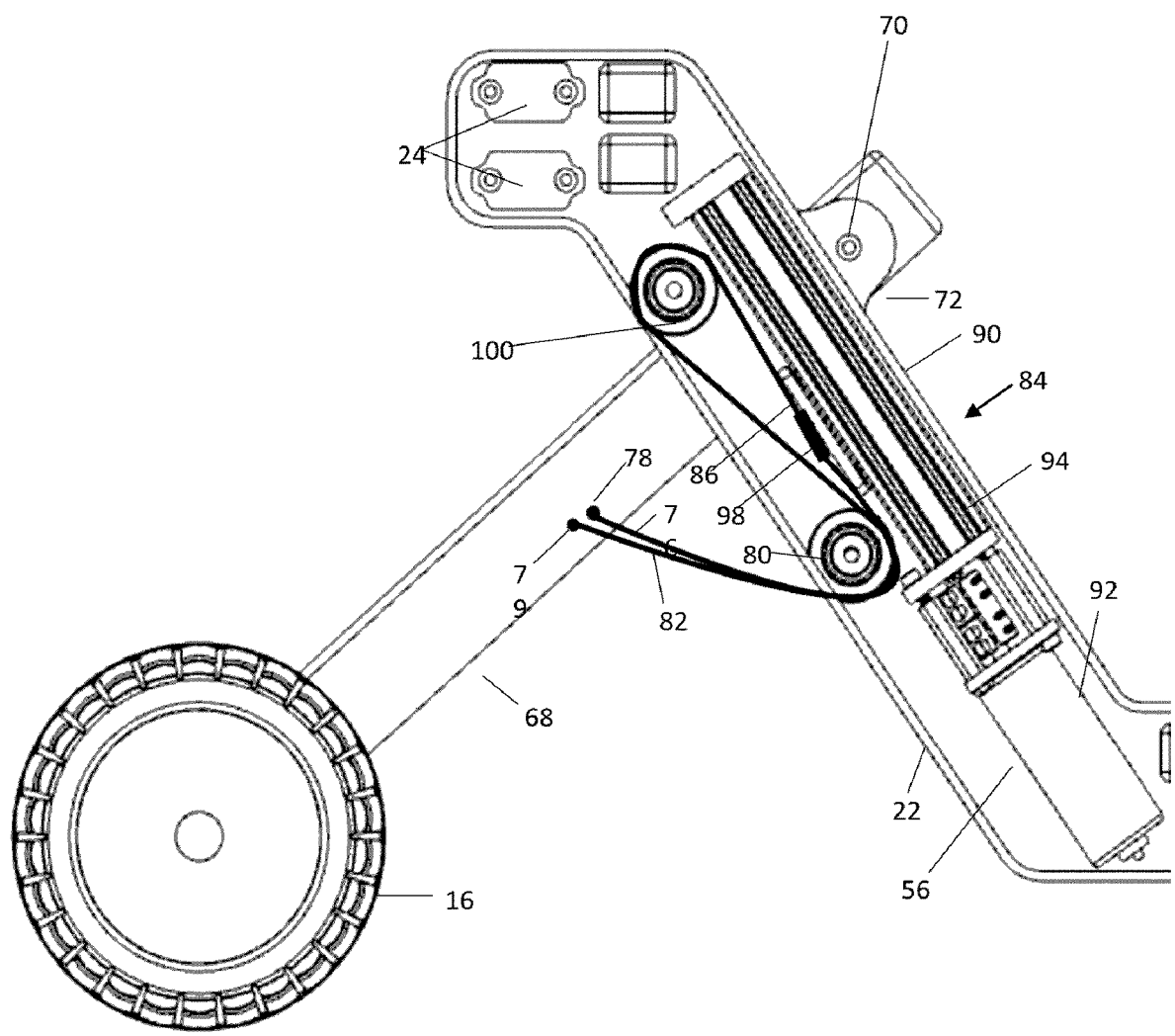
FIG. 5 is a detail view of a rear part of the vehicle viewed from one side.
Figure 6:
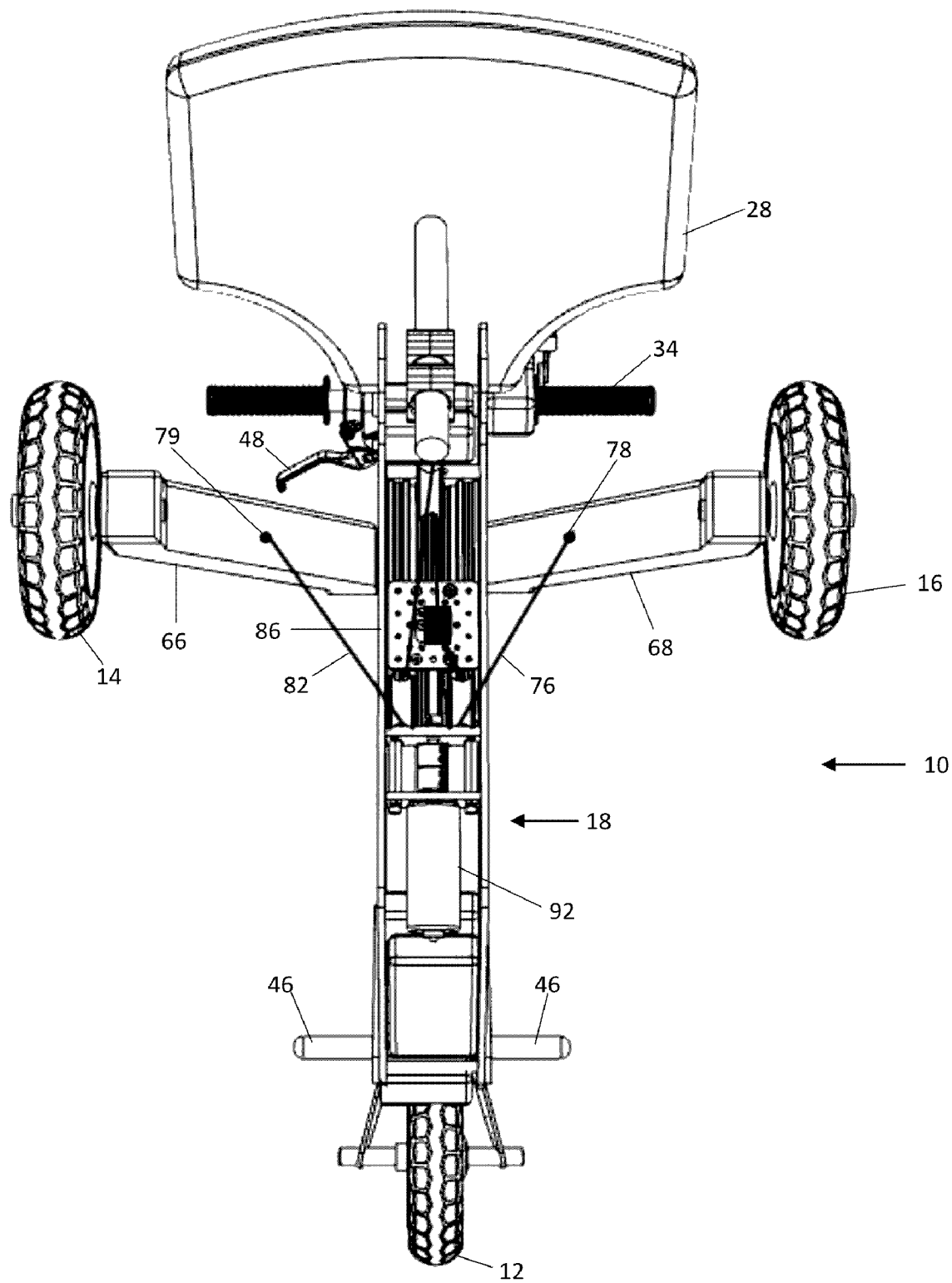
FIG. 6 is a view of the vehicle from beneath.

Referring in particular to FIG. 5, a right control line 76 is connected to the right wheel-bearing arm 68 at a right arm tether 78 which is at a part of the arm remote from its pivot axis 70. The right control line is led from the right arm tether 78 to a chassis-mounted line guide 80, carried in this example on the inclined chassis member 22.

If one looks at FIG. 5, it can be appreciated that a triangle is formed by (a) the right arm tether 78; (b) the chassis-mounted line guide 80; and (c) the pivot axis 70. The apex of this triangle (its highest point) is formed by the pivot axis 70 of the right wheel bearing arm 68. The right part 76 of the control line forms the base of the triangle (its lowermost edge). The internal angle at the triangle's apex is the angle between the right wheel-bearing arm 68 and the chassis 18, and determines the height of the right wheel 16 relative to the chassis 18. As the right control line is payed out or drawn in by the linear actuator 84, it changes the length of the base of the triangle and so changes the aforementioned apex angle and hence the height of the right wheel 16.

The right control line 76 supports a portion of the weight of the vehicle 10, and is thereby maintained in tension during operation of the vehicle 10—it will be apparent that weight borne by the right wheel 16 tends to cause that wheel to move upwards relative to the chassis 18, and this tendency is prevented by tension in the right control line 76, 82. If the length of the right control line 76—from the chassis-mounted line guide 80 to the right arm tether 78—is shortened, then the right wheel will move downwards relative to the chassis 18, or equivalently one can say that—since the right wheel 16 rests upon the ground—the right side of the chassis 18 is raised. If the same part of the right control line 76 is payed out, the right side of the chassis moves downward.

The control line arrangement is the same for the left wheel-bearing arm 66. A left control line 82 is led from a left arm tether 79 to the chassis-mounted line guide 80 to control turning movement of the left wheel-bearing arm 66.

The tilt control mechanism comprises an actuator acting on the control line 76, 82. In the present embodiment this is a linear actuator 84 carried on the chassis 18 and more specifically on the inclined chassis member 22. In this particular embodiment, the linear actuator 84 comprises a carriage 86 having carriage wheels 88 through which it engages rails 90. An electric actuator motor 92 drives a lead screw 94 which threadedly engages the carriage 86, so that rotation of the lead screw moves the carriage 86 along the rails 90 in a controllable manner. The electric motor is driven electrically by an actuator motor controller 96.

In the present embodiment, the control line 76, 82 is secured to the carriage 86 at a carriage tether 98. The left and right control lines 76, 82 may be formed by a single continuous line or by two separate lines both led to the carriage tether 98. The right control line 76 is led directly from the carriage 86 to the chassis-mounted line guide 80 and from there to the right arm tether 78. The left control line 82 is led from the carriage 86 to a second line guide 100 (which lies at the opposite end of the linear actuator 84 from the chassis-mounted line guide 80) and from there via the chassis-mounted line guide 80 to the left arm tether 79. The effect is that when the actuator 84 is operated in a first direction, the left control line 82 is payed out and the right control line 76 is drawn in. When the actuator 84 runs in the opposite direction, the left control line 82 is drawn in and the right control line 76 is payed out.

The line guides 80, 100 are formed by pulleys in the present embodiment. The chassis-mounted line guide comprises left and right pulleys 102, 104 receiving the left and right control lines 76, 82 respectively, to enable the control lines to move in opposite directions. However, any suitable form of line guide could be substituted. For example, plain fairleads could be used.

The depicted tilt control mechanism causes the left and right wheel-bearing arms 66, 68 to move simultaneously and oppositely—if one moves up, the other moves down. To tilt the vehicle toward its left, the carriage 86 is moved upwardly. The left control line 82 is payed out, letting the left wheel-bearing arm 66 rise relative to the chassis 18. The right control line 76 is drawn in, causing the right wheel-bearing arm 68 to move downwardly relative to the chassis 18. To tilt the vehicle toward the right, the carriage is moved downwards.

The vehicle 10 is able to be very easily collapsed for transport and storage. Merely by relieving the left and right wheels 14, 16 of the vehicle's weight, the left and right wheel-bearing arms 66, 68 are left free to pivot, and can be aligned for stowage, roughly parallel with the inclined chassis member 18, to reduce bulk. Withdrawing locking pins 46 enables the steering column 30 to pivot toward the chassis, and it may also be telescopically collapsed, providing a compact overall configuration.

The tilting action of the vehicle 10 is controlled in response to several different parameters by an electronic controller 106, which in the present embodiment is a digital programmable device. The controller 106 comprises or is connected to sensors responsive to the vehicle's condition. In particular, the controller 106 incorporates an inertial measurement unit (IMU). This is a well-known form of sensor array, familiar to the skilled engineer and typically comprising gyroscopes sensitive to rotation about three non-parallel axes and accelerometers sensitive to acceleration along three non-parallel axes. From the IMU sensor outputs, the controller may determine the current tilt of the vehicle with respect to the vertical (i.e. with respect to the local gravitational field). The controller 106 may also receive inputs from one or more sensors responsive to the angular position of one or more of the wheel-bearing arms 66, 68 (or of some other part in the tilt control mechanism whose position corresponds to the arm positions, such as the carriage 86). The controller may receive an input representing vehicle speed, which may be derived from a sensed wheel rotation rate. It may also receive an input representative of vehicle steering angle or radius, which may be derived from sensed angular position of the steering column 30.

Using its sensor inputs, the controller 106 may implement a number of control strategies.

In a first control strategy, especially suitable where the vehicle 10 operates at low speed, as in the case where the vehicle 10 takes the form of an invalid carriage, the tilt control mechanism is operated with the goal of keeping the chassis 18 vertical at all times. That is, the chassis 18 is to be prevented from leaning to the left or right, despite variations in the terrain over which the vehicle 10 moves. For this purpose, a feedback loop is implemented in which sensed tilt angle of the chassis 18 is the control variable. The controller responds to any sensed deviation of the chassis tilt angle from the vertical by operating the tilt control mechanism to reduce that deviation, in closed loop manner. A conventional PID (proportional, integral, differential) control strategy may be used for the purpose.

Trials of prototype vehicles have demonstrated that the vehicle depicted in the drawings is able to provide a very stable and consistently upright orientation of the chassis 18 and the seat 28, despite dramatic variations in the inclination of the ground over which the vehicle 10 passes. This can provide users—especially the elderly or infirm—with a greatly improved experience.

The present invention can nonetheless be implemented in vehicles capable of higher speeds, where it becomes desirable to provide for dynamic adjustment of the orientation of the chassis 18 with respect to the vertical, especially during cornering. At higher speeds, tilting the vehicle in the direction of cornering (i.e. tilting it to the left as it turns left, or to the right as it turns right) has a number of benefits. It helps to distribute load more evenly between left and right wheels, improves the vehicle's dynamic stability, and improves comfort for the user.

In a second control strategy, the tilt control mechanism is operated to regulate the vehicle's tilt angle (with respect to the vertical) but to cause the vehicle, during turning, to tilt in the direction of the turn. This mode of operation retains the advantage that the vehicle is maintained laterally upright despite variations in terrain, but adds to it the dynamic balancing during when turning.

A further embodiment of the present invention will now be described, which makes possible a different form of control over the tilting of the vehicle 10.

In the embodiments described above, the tilt control mechanism is active at all times whilst the vehicle is in use. The configuration of the tilt mechanism—and the positions of the left and right wheels 14, 16—are at all times controlled by the controller 106.

But many vehicles capable of tilting have no such automated control over their tilt angle, which is instead determined dynamically by a number of factors. Two-wheeled vehicles such as bicycles and motorbikes are examples. Tilting of such vehicles, and maintenance of their balance, happens due to dynamic factors including steering angle and consequent rate of lateral acceleration, vehicle speed, user position (the user's may shift their centre of gravity laterally) and gyroscopic force generated by the rotating wheels. The prior art listed above includes examples of three-wheeled vehicles which are similar to motorbikes in permitting the vehicle to tilt in response to these forces, without use of a mechanism to actively control vehicle tilt.

A problem that is familiar in relation to cyclists and motorbike riders is that their vehicles become less stable at low speed. Experienced cyclists are well able to maintain a dynamic state of balance underway. Few are able to keep their vehicle stable and upright—without putting a foot to the ground—when stationary at a road junction. Motorcyclists are often observed to trail one or both feet at low speeds, as an aid to balance.

The embodiment of the present invention to be described below is able to provide the benefits of automatically controlled balance in a first regime (preferably a low-speed regime) and the benefits of dynamic balancing in a second regime (preferably a higher-speed regime). It does so by actively controlling tilt angle through the tilt-control mechanism in the first regime, and by permitting the vehicle to tilt under the influence of dynamic factors in the second regime. Purely by way of example and not of limitation, the first regime may be engaged in a speed range from standstill until the vehicle reaches approximately 10 kilometres per hour (6 miles per hour), whereupon the second regime is selected. Once in the second regime, the vehicle may return to the low speed regime when its speed falls to approximately 6 kilometres per hour (3 miles per hour).

For this purpose, a releasable coupling arrangement 112 is provided to selectively couple and decouple the actuator 84 to/from the tilt control mechanism. In the present embodiment the releasable coupling arrangement is incorporated in the carriage tether 98. In the first regime the releasable coupling arrangement 112 engages the control line 76, 82, so that movement of the carriage 86 causes movement of the control line 76, 82. In the second regime, the releasable coupling arrangement 112 allows the control line to pass through freely, so that the control line 76, 82 and the tilt mechanism as a whole move independently of the carriage 86 and of the linear actuator 84.

Figure 7:
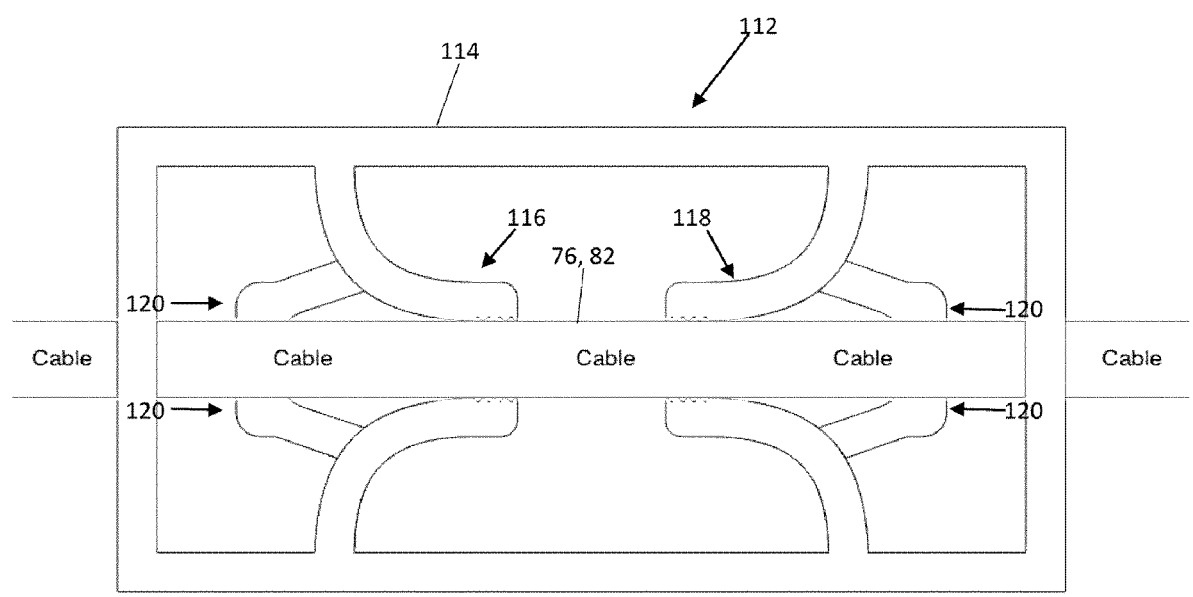
FIG. 7 is a somewhat schematic representation of a releasable coupling for use in a second embodiment of the vehicle.

The releasable coupling arrangement may take any of a wide variety of forms commensurate with its function. Purely by way of example, FIG. 7 illustrates a releasable coupling arrangement 112 having a housing 114 through which the control line 76, 82 passes, and containing a first set of cleat jaws 116 and a second set of cleat jaws 118. The first and second sets of cleat jaws 116, 118 are oppositely oriented—that is, one is arranged to lock the control line 76, 82 against movement in one direction, and the other is arranged to lock the control line 76, 82 against movement in the opposite direction, so that when both are engaged the control line 76, 82 is effectively coupled to the releasable coupling arrangement 112. The cleat jaws 116, 118 are releasable. Pressure applied along the arrows 120 causes them to release the control line 76, 82. This pressure may for example be applied through a suitable cable arrangement (not shown in the drawings).

In operation, when the vehicle is in the first regime (typically whilst static or whilst moving at low speed), the releasable coupling arrangement 112 is engaged to couple the tilt mechanism to the linear actuator 84, and vehicle tilt is thus automatically controlled by the controller 106. In the second regime (typically at higher speed), the releasable coupling arrangement 112 is disengaged, and the vehicle is free to tilt as a result of the dynamic forces acting upon it, without regulation by the controller 106.

The transition from one regime to the other must in some way be managed. In certain embodiments, the user has control over the transition, through a suitable user-operable control. Thus, it is the user who decides whether to rely on automatic tilt control, or to balance the vehicle themselves. In other embodiments, the controller 106 manages the transition, moving from one regime to the other based on measured operating parameters, especially speed, so that the vehicle is automatically provided with the advantages of stability at low speed and dynamic handling at higher speed. In order to ensure that the releasable coupling arrangement 112 engages the control line 76, 82 at an appropriate point along its length, and to provide a smooth transition to the first regime, the controller 106 may be programmed to position the actuator 84 based on the current tilt angle of the vehicle 10 (established through the sensors).

The mechanism described above controls vehicle tilt, by moving the left and right wheel-bearing arms 66, 68 in antiphase, which minimises any change in height of the seat 28 produced by the action of the tilt control mechanism. In other embodiments of the invention, however, a level control mechanism 122 is incorporated which serves to move the left and right wheel-bearing arms 66, 68 in phase with each other (i.e. both arms are moved in the same direction simultaneously by the level control mechanism 122).

Figure 8:
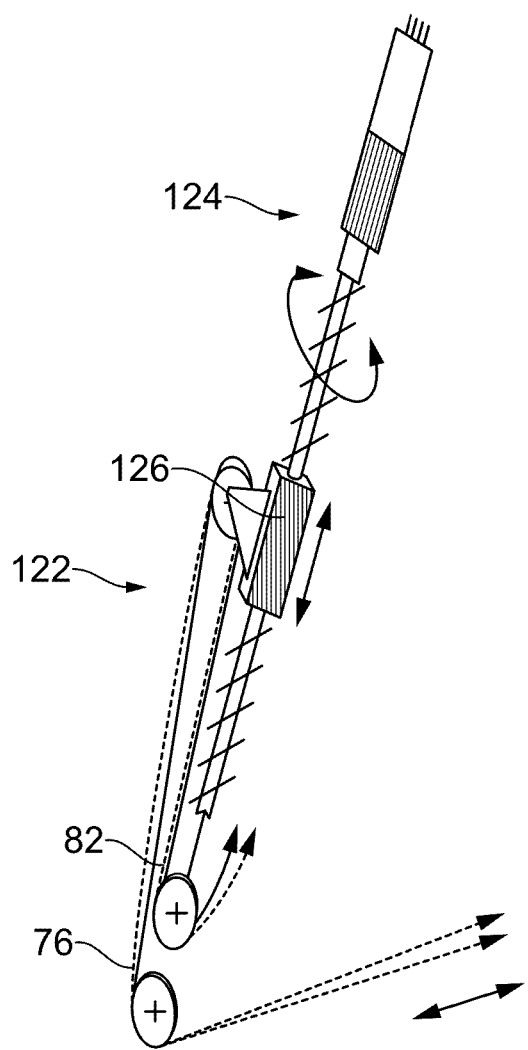
FIG. 8 is a detail view of a level control mechanism used in certain embodiments of the present invention.

While a range of different mechanisms may be used for the purpose, FIG. 8 illustrates an example which is well suited to use in the type of vehicle 10 described above, being a minor modification of it. This version of the tilt control mechanism 122 comprises a second actuator 124 arranged to pay out and to draw in both of the left and right control lines 82, 76 simultaneously. In the present example the second actuator 124 is a linear actuator carrying a pulley block 126 over which both of the right and left control lines 76, 82 are led. When the actuator 124 is driven to move the pulley block 126 upwardly, the effect is to draw in both control lines 76, 82 and to move the left and right wheels 14, 16 downwardly relative to the chassis 18. When the actuator 124 is driven to move the pulley block 126 downwardly, the effect is to pay out both control lines 82, 76 and to move the left and right wheels 14, 16 upwardly relative to the chassis 18.

Figure 9A:
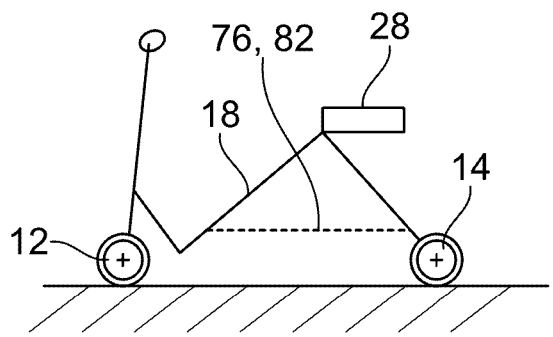
FIGS. 9*a*, 9*b*, 9*c* are simplified representations of the vehicle illustrating the effect of the level control mechanism.
Figure 9B:
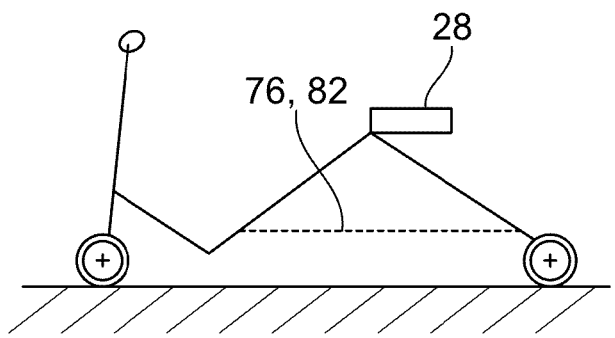
Figure 9C:
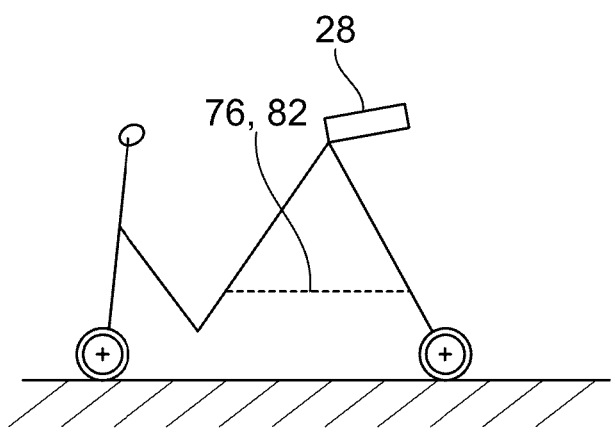

The effect of such level adjustment can be appreciated from FIGS. 9a to 9c. At a normal level (FIG. 9a) the seat 28 is at an intermediate height, and the vehicle is best configured for lateral stability. At a low level (FIG. 9b) the height of the seat 28 is reduced, the control lines 76, 82 being lengthened. The centre of gravity of the vehicle and user is relatively low, and the wheelbase of the vehicle 10 is extended, making the vehicle more stable in the fore-and-aft direction. This configuration may be adopted when travelling up or down steep inclines. At a high level (FIG. 9c), the seat height 28 is raised. This configuration may be less stable than others, but it serves to elevate the user. This may be desirable, for example, during social interaction, in order that the user need not look steeply upwards at companions during conversation.

It is emphasised that the foregoing embodiments are presented by way of example and not limitation. Numerous variations are possible without departing from the scope of the invention as set out in the appended claims. For example, the linear actuator 84 need not necessarily be an electrically driven device: it could instead by hydraulic. In a hydraulic system, the de-coupling of the actuator from the tile control mechanism could be achieved by means of a valve arrangement to permit fluid to move freely into and out of a working chamber of a hydraulic piston and cylinder arrangement, so that the hydraulic actuator would move freely with the tilting motion of the vehicle 10, without being physically disconnected from it. A rotary actuator, e.g. an electric motor, could be used in place of a linear actuator, with the control line 76, 82 being for example led around a pulley or gear to enable the rotary actuator to move the control line, and a rotary clutch being used in the second embodiment to couple/decouple the rotary actuator to the control line 76, 82. The controller 106 is depicted and described as a single unit in the foregoing, but it may take any suitable form. For example, its functions may be split over multiple processors and/or multiple physical units. It may be a networked device communicating with remote servers through a wide area network such as the mobile phone network (cell phone network in US English).

The invention claimed is:

1. A wheeled vehicle comprising:
a seat for supporting a rider;
a chassis which carries the seat;
a steerable wheel carried by the chassis and operably coupled to a steering arrangement for turning the steerable wheel to effect steering of the vehicle;
a left wheel-bearing arm which carries a left wheel and which is pivotally coupled to the chassis, so that pivotal movement of the left wheel-bearing arm provides up and down movement of the left wheel relative to the chassis;
a right wheel-bearing arm which carries a right wheel and which is pivotally coupled to the chassis to be movable independently of the left wheel-bearing arm, so that pivotal movement of the right wheel-bearing arm provides up and down movement of the right wheel relative to the chassis;
an actuator arrangement comprising an actuator which is carried on the chassis;
a left control line including a rope, a wire, a cord, or a chain which is led from a left tether on the left wheel-bearing arm to the actuator arrangement, so that upward movement of the left wheel relative to the chassis is restrained by the left control line acting in tension;
a right control line including a rope, a wire, a cord, or a chain which is led from a right tether on the right wheel-bearing arm to the actuator arrangement, so that upward movement of the right wheel relative to the chassis is restrained by the right control line acting in tension; and
wherein the actuator is operable in a first direction to pay out the left control line whilst drawing in the right control line, permitting the left wheel to move up relative to the chassis and causing the right wheel to move down relative to the chassis, thereby causing the vehicle to tilt toward the left, and
the actuator is operable in a second direction to pay out the right control line whilst drawing in the left control line, permitting the right wheel to move up relative to the chassis and causing the left wheel to move down relative to the chassis, thereby causing the vehicle to tilt toward the right.

2. The vehicle as claimed in claim 1, wherein the left and right control lines are portions of one continuous control line.

3. The vehicle as claimed in claim 1, wherein
the left wheel-bearing arm is coupled to the chassis through a pivot;
the left control line enters the actuator arrangement through a line guide;
the pivot, the left tether, and the line guide form vertices of a notional triangle whose apex is the pivot and whose base edge is the path taken from the pivot to the line guide, so that drawing in of the left control line makes the internal angle at the triangle's apex smaller, and paying out the left control line makes the internal angle at the triangle's apex larger.

4. The vehicle as claimed in claim 2, wherein the control line is a flexible member able to sustain tensile loading but not compressive loading.

5. The vehicle as claimed in claim 1, wherein the actuator is a linear actuator having a carriage movable back and forth along a linear path by a motor, the carriage being connected to the left and right control lines.

6. The vehicle as claimed in claim 5, wherein the left control line is led away from the carriage along a first direction, the right control line is led away from the carriage along a second direction, and the first and second directions are opposite one another.

7. The vehicle as claimed in claim 1, wherein the left and right wheel-bearing arms are free to move downwards relative to the chassis when relieved of the vehicle's weight, enabling them to be turned to a stowed configuration.

8. The vehicle as claimed in claim 1, further comprising a steering bearing which rotatably receives a steering column, the steerable wheel being mounted on the steering column, and wherein the steering bearing is coupled to the chassis through a pivotal connection provided with a releasable rotary locking arrangement, the pivotal connection enabling the steering column to be moved between a use position and a stowed position, and the rotary locking arrangement being configured to releasably lock the steering column in the use position.

9. The vehicle as claimed in claim 1, further comprising
an electronic controller operatively connected to the actuator;
a plurality of sensors configured to sense operating parameters of the vehicle, including the vehicle's lateral tilt with respect to a vertical;
the electronic controller being configured to control the actuator to regulate the vehicle's tilt with respect to the vertical in response to outputs of the sensors.

10. The vehicle as claimed in claim 9, wherein the electronic controller is operable in a mode in which it tends to maintain the vehicle vertically upright despite variations of terrain.

11. The vehicle as claimed in claim 9, wherein the electronic controller is operable in a mode in which it regulates the vehicle's lateral tilt to compensate for variations of terrain and also causes the vehicle to tilt in the direction of a turn.

12. The vehicle as claimed in claim 9, further comprising a reversibly releasable coupling between the actuator and the control line, enabling the vehicle to be operated in
(1) a first regime in which the releasable coupling is engaged and lateral vehicle tilt is controlled by the controller through the actuator; and
(2) a second regime in which the releasable coupling is disengaged and vehicle lateral tilt is able to vary independently of the actuator.

13. The vehicle as claimed in claim 12, wherein the releasable coupling is controlled by the controller which is configured to operate the vehicle in the first regime in a low speed range and in the second regime in a higher speed range.

14. The vehicle as claimed in claim 1 further comprising a level adjustment mechanism which is:
   operable in a first direction to pay out the left and right control lines concurrently causing the left and right wheel-bearing arms to move upward relative to the chassis; and
   operable in a second direction to draw in the left and right control lines concurrently causing the left and right wheel-bearing arms to move downward relative to the chassis.

15. A steerable, powered, wheeled vehicle comprising:
   a chassis;
   at least one steerable wheel whose steering movement controls turning of the vehicle;
   a left wheel which is movable up and down with respect to the chassis;
   a right wheel which is movable up and down with respect to the chassis;
   a tilt control mechanism which operatively couples the left and right wheels, so that when the left wheel moves up the right wheel moves down, relative to the chassis, and so that when the left wheel moves down, the right wheel moves up, relative to the chassis, the tilt control mechanism comprising a control line including a rope, a wire, a cord, or a chain, the control line acts in tension to restrain upward movement of the left and right wheels relative to the chassis;
   an actuator operatively coupled to the control line through a reversibly releasable coupling;
   a plurality of sensors responsive to lateral tilt of the vehicle; and
   a controller configured to receive outputs of the sensors and to control the actuator,
   the vehicle being configured to be operable in first and second regimes, wherein
      in the first regime the releasable coupling is engaged so that the actuator is operatively coupled to the control line, and the controller regulates lateral tilt of the vehicle based on the sensor outputs, through the actuator and the tilt control mechanism;
      in the second regime the releasable coupling is disengaged from the control line and the vehicle is able to tilt laterally independently of the actuator.

16. The vehicle as claimed in claim 15, wherein the controller is configured, in the first regime and in a first mode, to operate the actuator and tilt control mechanism in a manner which tends to keep the vehicle vertical despite variations of terrain.

17. The vehicle as claimed in claim 16, wherein the electronic controller is configured to implement closed loop control of vehicle tilt based on deviation of a vehicle's sensed lateral tilt from the vertical.

18. The vehicle as claimed in claim 15, wherein the electronic controller is configured to be operable in a second mode in which it regulates the vehicle's lateral tilt to compensate for variations of terrain and also causes the vehicle to tilt in the direction of a turn.

19. The vehicle as claimed in claim 15, further comprising a level control mechanism which is:
   operable in a first direction to cause the left and right wheels both to move upwardly relative to the chassis; and
   operable in a second direction to cause the left and right wheels both to move downwardly relative to the chassis.

20. A wheeled vehicle comprising:
   a seat for supporting a rider;
   a chassis which carries the seat;
   a steerable wheel carried by the chassis and operably coupled to a steering arrangement for turning the steerable wheel to effect steering of the vehicle;
   a left wheel-bearing arm which carries a left wheel and which is pivotally coupled to the chassis, so that pivotal movement of the left wheel-bearing arm provides up and down movement of the left wheel relative to the chassis;
   a right wheel-bearing arm which carries a right wheel and which is pivotally coupled to the chassis to be movable independently of the left wheel-bearing arm, so that pivotal movement of the right wheel-bearing arm provides up and down movement of the right wheel relative to the chassis;
   an actuator arrangement comprising an actuator which is carried on the chassis;
   a left control line which is led from a left tether on the left wheel-bearing arm to the actuator arrangement, so that upward movement of the left wheel relative to the chassis is restrained by the left control line;
   a right control line which is led from a right tether on the right wheel-bearing arm to the actuator arrangement, so that upward movement of the right wheel relative to the chassis is restrained by the right control line acting in tension; and
   wherein the actuator is operable in a first direction to pay out the left control line whilst drawing in the right control line, permitting the left wheel to move up relative to the chassis and causing the right wheel to move down relative to the chassis, thereby causing the vehicle to tilt toward the left,
   the actuator is operable in a second direction to pay out the right control line whilst drawing in the left control line, permitting the right wheel to move up relative to the chassis and causing the left wheel to move down relative to the chassis, thereby causing the vehicle to tilt toward the right, and
   the left wheel-bearing arm is coupled to the chassis through a pivot;
   the left control line enters the actuator arrangement through a line guide;
   the pivot, the left tether, and the line guide form vertices of a notional triangle whose apex is the pivot and whose base edge is the path taken from the pivot to the line guide, so that drawing in of the left control line makes the internal angle at the triangle's apex smaller, and paying out the left control line makes the internal angle at the triangle's apex larger.

* * * * *